Feb. 3, 1959   J. OBREBSKI ET AL   2,871,887
MANIFOLDING
Filed April 26, 1955
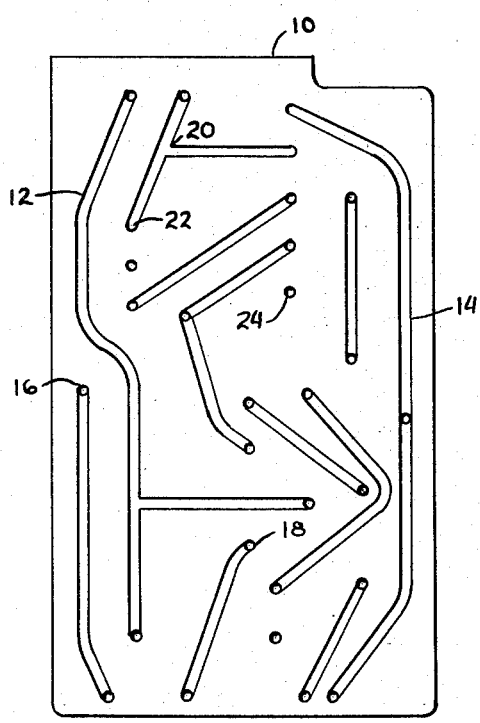
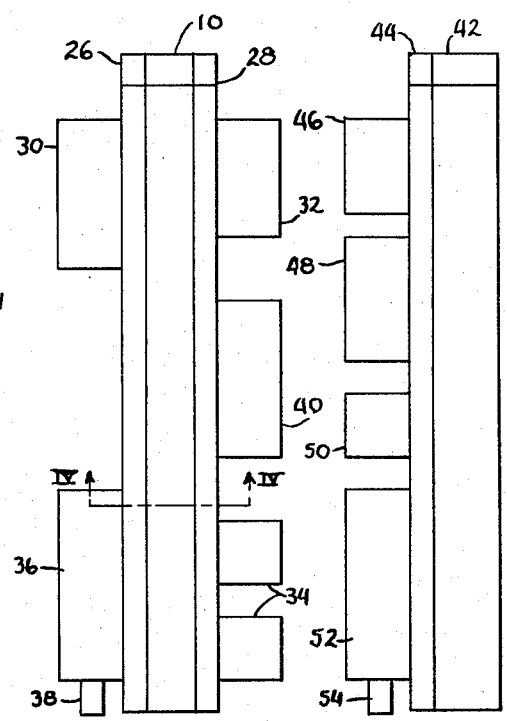
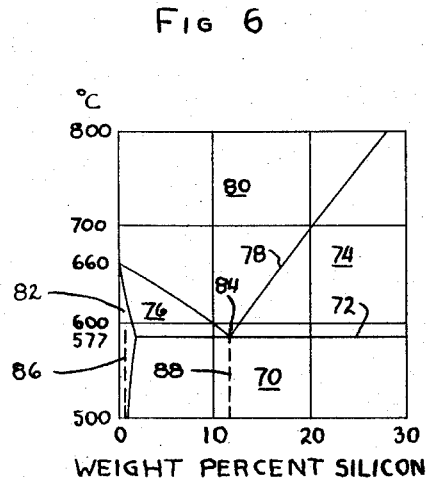
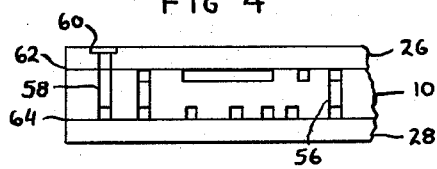
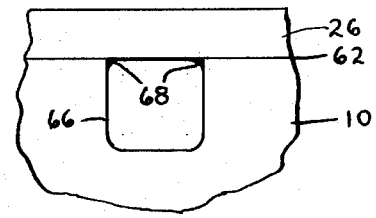
INVENTORS
JOHN OBREBSKI
BY NAGLE V. GUSCHING
AGENT

United States Patent Office 2,871,887
Patented Feb. 3, 1959

2,871,887

MANIFOLDING

John Obrebski and Nagle V. Gusching, Sidney, Ohio, assignors to The Monarch Machine Tool Company, Sidney, Ohio, a corporation of Ohio Application April 26, 1955, Serial No. 504,000

5 Claims. (Cl. 138—87)

This invention relates to securing a series of plates together in sandwich form wherein some of the plates contain the grooves for the passage of hydraulic fluid and the other plates serve as covers to enclose the grooves and make them independent passages to conduct hydraulic or other fluid for flow or pressure signals. The prior methods of conducting fluids through tubing had considerable problems such as the cost of fabrication, the errors which could be made by inexperienced workmen assembling the tubing circuit, and the reduction in life caused by vibration and fatigue in the tubing.

Accordingly, it is an object of this invention to fabricate channels for the conduction of fluids more economically than by prior methods.

It is another object of this invention to provide means whereby channel junctions and connections can be readily made without the chance of errors.

It is a further object to provide a sandwich of plates or manifold having strength and long life when compared to the ordinary tubing methods by the elimination of vibration and consequent fatigue problems.

It is another object to provide fluid channels which are comparatively inexpansible under high fluid pressures.

It is another object to provide a manifold which provides smooth curves to permit smooth flow of fluids without the turbulence caused by rough passages and quick changes in size or direction of the fluid passageway.

It is another object to provide means which permit the use of complex fluid circuits without the otherwise necessary complex stands of tubing and the associated error possibilities.

It is a further object to provide an aluminum manifold which is free from the problems of rusting such as occurs with steel tubing and which is inert to the usual atmospheres which are found in hydraulic environments.

It is another object to provide an aluminum manifold which is inert to oil and thus prevents the formation of harmful components within the hydraulic fluid thereby preventing harm to the equipment associated therewith.

Other objects and advantages will be apparent on reading of the following specification and inspection of the drawing referred to therein in which:

Figure 1 shows a side elevation of the center member or body plate of a manifold, Figure 2 shows an edge elevation of a finished manifold laminated of three sections and showing hydraulic components mounted thereon, Figure 3 shows an edge elevation of a manifold laminated of two sections and having hydraulic components mounted thereon, Figure 4 shows a partial section through the manifold taken on the line IV—IV of Figure 2, Figure 5 shows a detailed section through one of the passages of a brazed manifold plate such as are shown in Figure 4, and Figure 6 shows an aluminum-silicon phase diagram.

Referring now to Figure 1, at 10 is shown the one side of a manifold plate having a plurality of grooves such as 12 and 14 in the flat side of the plate. These grooves may be formed in the plate by casting the body plate in an appropriate mold or by using wrought or other aluminum stock and milling the grooves therein. As is hereinafter described the grooves are covered by another plate and thus form passages for the conduction of hydraulic fluid or other fluid power or signal medium. Because of this purpose the grooves may be formed in any configuration which is in accord with the requirements of the finished plate. In some cases the ends of the grooves have holes drilled through the plate 10 such as holes 16 and 18. These holes may pass straight through the plate and such other pates as may be ultimately brazed to the side of body or center plate 10 which is away from the viewer to connect to a valve or line, or may pass only to the other side of the center plate where another groove may conduct the fluid in a different direction. It should be noted that several grooves may be connected together as at 20 and that some of the grooves may have ends such as 22 which do not connect through the plate but are connected by a hole in the outer plate that is ultimately brazed on the side nearest the viewer. Furthermore, some of the grooves on the farther side of the center plate 10 may be connected by means of holes such as 24 through the outer plate or cover plate on the near side of center plate 10.

In Figure 2 the center plate 10 is shown as having outer plates 26 and 28 brazed thereto. It can be seen from the foregoing that the configuration of the grooves in the center plate 10 can be of any shape which is reasonable and desired by the designer. Thus, outlets to actuate valves such as is shown at 30 and 32 may be provided from the grooves of the center plate and the valves may be interrelated with other hydraulic components such as filters 34 or a hydraulic actuator such as member 36 which contains a piston having a piston rod 38. The system could be designed so that pressure is supplied through an external connector to a groove in the center plate 10 and this pressure is supplied to a certain groove in the body of valve 30. A signal from valve 32 might move the valve stem in valve 30 to supply a signal which passes through one of the filters 34 before it passes through an orifice in valve 40. Valve 40 could readily be connected to operate the piston rod 38. It is thus seen that complex fluid circuits can readily be designed in a compact manner and be free from the more usual complex tubing. It should be noted that tubing is subject to fatigue and vibration as well as errors in assembly and the use of a manifold also provides for the physical mounting of hydraulic components.

Figure 3 shows a similar situation with a manifold plate 42 having grooves cut in only one side thereof. These grooves are covered by a cover plate 44 to provide continuous fluid passages similar to those previously discussed. It should be noted however that when the grooves are cut in only one side of a plate the circuit must be relatively simple for there is no provision for the crossing of grooves as is possible in the plate laminated from three parts. In similar manner the plate in Figure 3 has valves 46 and 48 mounted thereon and it may also be provided with a filter such as 50 and an actuator such as 52 having a piston and piston rod 54.

Figure 4 shows a section through a manifold plate laminated from the center plate 10 and the outer plates 26 and 28. Here, the grooves are shown as being connected from one side of the plate to another as at 56 and being connectable to an exterior member by passage 58 which is sealable by an O-ring in O-ring groove 60. The lines at 62 and 64 show the layer of brazing alloy.

Figure 5 shows a detailed section of a groove 66 in the plate 10, said groove being covered by an outer plate 26, and after brazing of this sandwich, fillets 68 are formed to make a tight fluid passageway of the channel 66. It should be noted that when brazing the large flat areas such as are found in these plates it is quite difficult to remove all of the flux from the joint. There is always a possibility that one channel may be open across the flat part to an adjacent channel due to flux inclusions. However, a generous fillet makes a tight passageway.

The materials used in properly brazing together a sandwich which is mechanically and hydraulically tight must be carefully chosen so that they meet all of the requirements of the situation. As previously stated the center plate is preferably manufactured of aluminum and in order to cooperate properly with aluminum brazing alloy, the center plate should have a relatively low silicon content.

Referring now to the phase diagram of Figure 6, the horizontal notation shows the percentage by weight of silicon in aluminum and the vertical scale shows the temperature in degrees centigrade. The area 70 represents a solid crystalline mixture including crystals containing silicon dissolved in aluminum. Below the solidus 72 at 577° C. the alloy is solid. In the areas 74 and 76 the consistency is that of liquid containing unmelted crystals. The closer the alloy reaches the liquidus line 78 the fewer crystals are in the liquid alloy and the alloy becomes more fluid. Closer to the solidus line 72 the alloy is more pasty in consistency because it contains more crystals. In the area 80 the alloy is liquid and in the area 82 the alloy is solid with silicon completely dissolved in the aluminum. A eutectic point 84 occurs at 11.6% silicon.

The alloy of the center plate is chosen to have less than 1.65% silicon, the limit of the amount of silicon soluble in aluminum at 577° C., so that the temperature of the center plate may be raised above the horizontal part of the solidus for brazing purposes without having the center plate lose shape. In practice an alloy of .6% silicon and having .25% copper and 1.0% magnesium to control oxidation is suitable. In commercially available alloys impurities of chromium, iron, zinc, manganese and titanium are normally found. The dotted line 86 indicates generally the line along which this alloy would be heated during a brazing operation. It should be noted, however, that the addition of alloying elements in addition to silicon changes the phase diagram somewhat from the pure aluminum-silicon diagram shown in Figure 6.

The outer plates 26, 28, and 44 are also chosen from an alloy of this nature, and a brazing alloy of similar constituency but having about 11.6% silicon is provided to do the bonding of the sandwich. The silicon content of the brazing alloy may be anything over 1.65% for as soon as such an alloy is heated above 577° C., the solidus 72, liquid appears, but the closer the alloy is to 11.6% silicon the more rapidly melting occurs. For practical purposes between 8 and 15 percent silicon is operative but the closer the alloy is to the eutectic the lower the temperature at which it becomes fluid. It should be noted that the fluidity of the brazing alloy has a great bearing on the character of the fillets 68. With high fluidity they are small and sound while with less fluidity they will normally be larger but are likely to be more porous due to flux inclusions. This alloy would be heated along the line 88 and if it was a true eutectic alloy it would become completely molten at 577° C. This alloy may be provided in the brazing area in the form of brazing sheet which is cut to the appropriate shapes, as wire which is laid between the several plates, or preferably as an integral part of one side of each of the plates 26 and 28 by being clad thereon. In this case the brazing alloy is rolled onto one side of plates 26 and 28 to form a brazing layer thereon. Of course, it could equally well be clad on the sides of the body plate. This clad plate is commercially available and the brazing alloy clad runs between .010 and .020 inch thick on one side of each outer plate and this is suitable for the purpose. The use of a clad brazing alloy is advantageous because it cuts in half the number of surfaces that must be fluxed.

The method of treatment of the various portions of the manifold are important for numerous problems can arise if improper procedures are used. If a cast center plate having grooves cast therein is used the sides must be made relatively smooth and flat. Milling the sides is usually sufficient, providing tool marks and tool overlaps are kept to a minimum. If a wrought center plate is used it is cut to the appropriate external shape and the necessary grooves are milled and holes are drilled therein. When the elements of the manifold plate have been physically prepared, they are assembled in the manner in which they will finally be brazed. Then they are placed between two comparatively heavy flat jigs and are annealed in sandwich form for five hours at about 455° C. This makes sure that there are no residual stresses internal of the members which would cause them to warp during the subsequent brazing process. Five hours are required because of the relatively heavy masses of the jigs which are necessary to hold the members flat during the annealing. After cooling from the anneal, the plates are cleaned by etching in caustic soda which is maintained at 5 to 10% strength and at 170° F. The caustic soda is followed by a cold water wash and a dip in nitric acid in about 50% concentration. Another cold water wash and a hot water wash precede a dip in a mixture of nitric and hydrofluoric acids in a water solution. This solution is about 10% nitric and .25% hydrofluoric acid. Here the concentrations above a minimum are prescribed by the desired speed of reaction and economic limits, and the minimum concentrations are given above. Next the plates are washed in cold water and brushed to remove loose dirt. The above cycle is repeated until all aluminum oxide is removed from the plate surfaces. Finally the plate is dried by blowing with compressed air or the like.

Now each of the surfaces is fluxed by suitable means with a flux containing fluorides and chlorides which dissolve aluminum oxide, and thermocouples are appropriately placed to enable accurate temperature observation. The manifold is assembled and placed on a flat jig and is loaded into the furnace wherein the temperature at the brazing line is raised to 584 to 590° C. When this temperature is attained the manifold is removed from the furnace and cooled. The manifold plate is etched in the manner described above to clean it of all traces of excess oxides which were formed by furnace temperatures and excess flux. As a final step the manifold is tested to assure tight passages and free flow through the passageways.

This invention having been described in its preferred embodiment is susceptible to numerous modifications and changes and it is desired that the scope of the invention be defined by the appended claims.

What we claim is:

1. In an aluminum manifold having separate passageways therein defining a plurality of separate fluid conduits, a body plate having a plurality of separate grooves formed therein defining the shape of the separate fluid passageways, a cover plate causing the grooves to form the separate passageways in fluid tight relation to each other, holes in said cover plate connecting said passageways to the outside of the cover plate for the connection of the fluid passageways to fluid apparatus, said body plate and said cover plate being of an alloy of aluminum having less than 1.65% silicon, a brazing alloy containing aluminum and more than 1.65% silicon between said plates and bonding said plates together, said brazing alloy forming fillets along the juncture between said body plate and cover plate to render said fluid passageways fluid tight, said plates being substantially planar after brazing.

2. The method of manufacturing an aluminum manifold plate containing fluid passageways comprising the steps of: forming grooves in a body plate, providing a cover plate to cover the grooves to create fluid passageways, assembling the plates in sandwich form, annealing the sandwich in sandwich form in such a manner as to render it substantially flat and stress free, etching the plates to remove surface aluminum oxide, fluxing the surfaces to be brazed, providing a brazing alloy which melts at a lower temperature than body and cover plates, and brazing the plates in sandwich form at an elevated temperature.

3. The method of claim 2 wherein the grooves are formed by a milling operation.

4. The method of making unitary manifold plates out of aluminum plates, said manifold plates being suitable for the conduction of hydraulic fluids for the control and operation of hydraulic components, comprising the steps of milling grooves in a body plate in a configuration representing the desired shape of the passageways of the final unitary manifold plate, providing a cover plate to cover the grooves in the body plate to thus provide a cover for the grooves, assembling the plates into sandwich form in the same relationship that they will occupy during brazing, annealing the plates while in sandwich form and while supported and weighted to hold the sandwich substantially flat while the annealing renders the sandwich substantially stress free, disassembling the sandwich into separate plates so that they may be separately processed, etching the plates while they are separated from the sandwich form to remove surface aluminum oxide from the plates, providing brazing material that melts at a temperature lower than the melting temperature of the plates, fluxing the surfaces to be brazed so that brazing can occur in the absence of aluminum oxide, and brazing the plates together in sandwich form at a temperature below the melting point of the body plate and cover plate and above the melting temperature of the brazing material to render the plates into a unitary manifold having fluid tight passageways suitable for the conduction of fluids under pressure.

5. The method of making unitary manifold plates out of aluminum plates, said manifold plates being suitable for the conduction of hydraulic fluids for the control and operation of hydraulic components, comprising the steps of forming grooves in a body plate in a configuration representing the desired shape of the passageways of the final unitary manifold plate, providing a cover plate to cover the grooves in the body plate to thus provide a cover for the grooves, assembling the plates into sandwich form in the same relationship that they will occupy during brazing, annealing the plates while held together in sandwich form and while supported to hold the sandwich substantially flat while the annealing renders the sandwich substantially stress free, disassembling the sandwich into separate plates so that they may be separately processed, etching the plates while they are separated from the sandwich form to remove surface aluminum oxide from the plates, providing brazing material that melts at a temperature lower than the melting temperature of the plates, fluxing the surfaces to be brazed so that brazing can occur in the absence of aluminum oxide, and brazing the plates together in sandwich form at a temperature below the melting point of the body plate and cover plate and above the melting temperature of the brazing material to render the plates into a unitary manifold having fluid tight passageways suitable for the conduction of fluids under pressure.

References Cited in the file of this patent

UNITED STATES PATENTS

| | | |
|---|---|---|
| 1,964,300 | Perry et al. | June 26, 1934 |
| 1,983,227 | Hall et al. | Dec. 4, 1934 |
| 2,154,217 | Savage | Apr. 11, 1939 |
| 2,312,451 | Strike | Mar. 2, 1943 |
| 2,443,574 | Burns | June 15, 1948 |
| 2,458,427 | Russell et al. | Jan. 4, 1949 |
| 2,465,260 | Olson | Mar. 22, 1949 |
| 2,602,413 | Miller | July 8, 1952 |
| 2,640,793 | Doerr | June 2, 1953 |
| 2,646,620 | Geddes et al. | July 28, 1953 |
| 2,659,138 | Stroup | Nov. 17, 1953 |